United States Patent [19]

De Bie et al.

[11] Patent Number: 4,570,063

[45] Date of Patent: Feb. 11, 1986

[54] DEVICE FOR THE OPTICAL SCANNING OF A DOCUMENT

[75] Inventors: Johannes H. De Bie, Hilversum; Adrianus J. J. Franken, Eindhoven, both of Netherlands

[73] Assignee: U.S. Philips Corporation, New York, N.Y.

[21] Appl. No.: 505,601

[22] Filed: Jun. 20, 1983

[30] Foreign Application Priority Data

Jul. 6, 1982 [NL] Netherlands ................... 8202698

[51] Int. Cl.[4] ............................................. G02B 5/14
[52] U.S. Cl. ................................. 250/227; 350/96.25
[58] Field of Search ............... 250/227; 350/96.24, 350/96.25; 358/200

[56] References Cited

U.S. PATENT DOCUMENTS 3,566,083  2/1971  McMillin ........................... 250/227
4,185,888  1/1980  Quelle, Jr. ........................ 350/96.25

Primary Examiner—David C. Nelms
Assistant Examiner—J. Gatto
Attorney, Agent, or Firm—Thomas A. Briody; William J. Streeter; Marianne Rich

[57] ABSTRACT

The device comprises a transducer (3) with photoelectric elements (31) and a coupling member (5) which comprises an entrance face (9) which is to be aimed at the document and an exit face (11) which is optically coupled to the transducer. The coupling member (5) comprises a number of light conductors (7) having first ends (13) which are arranged in at least one straight line in the entrance face (9) and second ends (21) which are situated in arbitrary positions in the exit face (11). The relation between the positions of the first ends (13) in the entrance face (9) and the positions of the second ends (21) in the exit face (11) is stored in a memory (29). The photosensitive surface of the transducer (3) may have an arbitrary length/width ratio and the light conductors (7) may extend rather arbitrarily through the coupling member (5) so that the cost of the device may be comparatively low.

7 Claims, 7 Drawing Figures

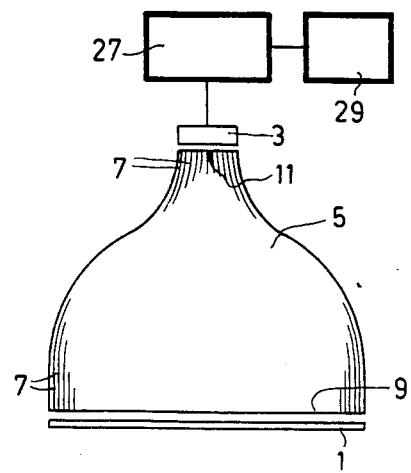
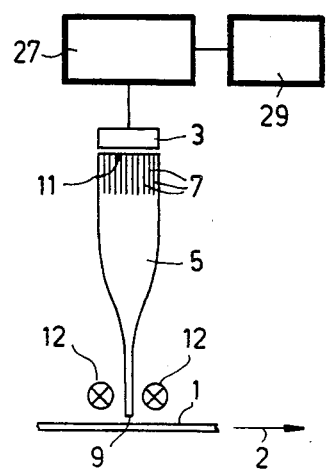
FIG.1   FIG.2
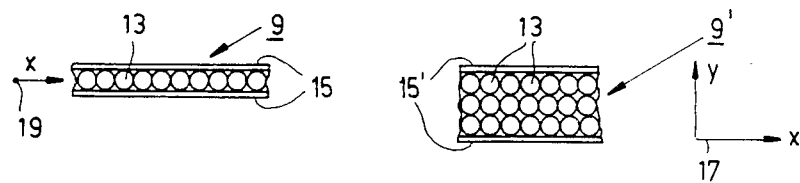
FIG.3   FIG.4

DEVICE FOR THE OPTICAL SCANNING OF A DOCUMENT

BACKGROUND OF THE INVENTION

1. Field of the Invention

The invention relates to a device for the optical scanning of a document, comprising a transducer with photoelectric elements and a coupling member which comprises an entrance face which is to be aimed at the document and an exit face which is optically connected to the transducer, said coupling member comprising a plurality of light conductors which extend from the entrance face to the exit face and whose first ends are arranged in at least one line in the entrance face.

2. Description of the Prior Art

A device of this kind of known from U.S. Pat. No. 3,318,996. The transducer thereof consists of a large number of photoelectric elements which are arranged in a straight line. Such transducers have a very large length-to-width ratio, are comparatively expensive, and are often not available in the desired length. The light conductors must be accurately positioned with respect to one another in the coupling member; this is a time consuming and hence expensive operation.

SUMMARY OF THE INVENTION

It is an object of the invention to provide a device of the kind set forth in which the transducer may have an arbitrary length-to-width ratio which may even amount to approximately 1, if desired, and in which the light conductors may extend more or less at random through the coupling member, so that the cost of the transducer as well as that of the coupling member may be comparatively low.

To this end, the device in accordance with the invention is characterized in that the second ends of the light conductors are situated in arbitrary positions in the exit face of the coupling member, the device comprising a memory in which the relation existing between the positions of the first ends in a system of coordinates associated with the entrance face and the positions of the second ends in a system of coordinates associated with the exit face, is stored.

After combination of the coupling member and the transducer, this relation can be readily established, for example, by successively illuminating all first ends of the light conductors and by determining each time which photoelectric elements produce an output signal in reaction thereto. This information can be stored in the memory, for example, a programmable read-only memory (PROM).

A preferred embodiment of the device in accordance with the invention is characterized in that the surface area of the second end of a light conductor amounts to a multiple of the photosensitive surface area of a photoelectric element. Each second end thus exposes an associated group of photoelectric elements in this embodiment, so that the relevant first end wherefrom this light originates can be identified with certainty.

The surface area of the transducer is economically used in a further preferred embodiment which is characterized in that the second ends of the light conductors fill the exit face in a dense packing.

BRIEF DESCRIPTION OF THE DRAWING

The invention will be described in detail hereinafter with reference to the drawing. Therein:

FIG. 1 is a diagrammatic front view of a first embodiment of a device in accordance with the invention;

FIG. 2 is a diagrammatic side elevation of the device shown in FIG. 1;

FIG. 3 shows a part of a first embodiment of an entrance face of a coupling member;

FIG. 4 shows a part of a second embodiment of an entrance face of a coupling member;

DESCRIPTION OF THE PREFERRED EMBODIMENTS

Figure 5:
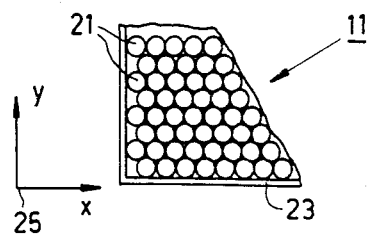
FIG. 5 shows an embodiment of an exit face of a coupling member.

FIGS. 1 and 2 diagrammatically show a device for the optical scanning of a document 1 (for example, a sheet of paper having the format A4 which is moved in the direction of the arrow 2 by means of a known transport device which is not shown) which comprises a transducer 3 with photoelectric elements and a coupling member 5 which comprises a number of light conductors 7. The coupling member 5 comprises an entrance face 9 which faces the document 1 and an exit face 11 which is optically connected to the transducer 3 in that it is positioned against the transducer or at a very short distance therefrom, if desired, with an intermediate layer of transparent cement or a lens (not shown). For the illumination of the document 1, an elongate light source 12, for example, a tubular lamp (omitted in FIG. 1 for the sake of clarity) is arranged near the entrance face 9 on both sides of the coupling member 5. Alternatively, a light source may be arranged underneath the document 1.

The light conductors 7 extend from the entrance face 9 to the exit face 11, their first ends being arranged in one or more straight lines in the entrance face whilst their second ends are arranged in arbitrary positions in the exit face which is preferably filled in a dense packing. FIGS. 3 and 4 show two feasible arrangements of the first ends in the entrance face, and FIG. 5 shows a feasible arrangement of the second ends in the exit face.

FIG. 3 shows a part of the entrance face 9 in which the first ends 13 of the light conductors 7 are arranged in a single straight line. The first ends 13 are arranged so that they contact one another and intercept a maximum amount of light from the document 1. They are retained in a mount 15 in which they can be secured by means of cement.

FIG. 4 shows a part of a further embodiment 9' of the entrance face in which the first ends 13 of the light conductors 7 are arranged in three parallel straight lines. In this embodiment the first ends 13 are again arranged so that they contact one another. They are retained in a mount 15'. If a denser packing of the first ends 13 is desired (enabling scanning with a higher resolution), the central one of the three lines may be shifted to the left or the right over a distance which corresponds to half the diameter of the first ends. If desired, the number of lines in which the first ends 13 are arranged may be chosen to be so large that the surface area of the entrance face 9' equals the surface area of the document 1 to be scanned. In that case the document need not be transported in the direction of the arrow 2 during scanning. The position of each first end 13 in the entrance face 9' can be indicated in an orthogonal system of coordinates 17 which is associated with the entrance face and which comprises an X-axis and a Y-axis. For the embodiment shown in FIG. 3, a one-dimensional system of coordinates 19 which comprises only an X-axis suffices.

FIG. 5 shows a part of an embodiment of the exit face 11. The second ends 21 of the light conductors 7 are arranged in the exit face 11 in a dense packing (hexagonal densest circular packing) so that they fill the exit face as well as possible. They are retained in a mount 23. The position of each second end 21 in the exit face 11 can be indicated in an orthogonal system of coordinates 25 which is associated with the exit face and which comprises an X-axis and a Y-axis.

The transducer 3 is connected to a signal processing device 27 (see FIGS. 1 and 2) which comprises an amplifier for the amplification of the signals supplied by the photoelectric elements and which also comprises a register for the storage of these signals so that they can be applied in the correct sequence to a further device, for example, a printer or a fascimile transmitter (not shown). The signal processing device 27 is extended with a memory 29 on which the relation existing between the positions of the first ends 13 in the system of coordinates 17 or 19 associated with the entrance face 9 or 9' and the positions of the second ends 21 in the system of coordinates 25 associated with the exit face 11 is stored. Because the light conductors 7 extend arbitrarily through the coupling member 5, it may readily occur that even though the first ends 13 of the two light conductors are adjacently situated in the entrance face their second ends 21 are separated from one another in the exit face 11 by a number of other second ends. When the transducer 3 indicates that light is received from a given second end 21, the information stored in the memory 29 can be used to determine which first end 13 is illuminated. Consequently, the distribution of the light entering via the entrance face 9 can be reconstructed from the distribution of the light emerging from the exit face 11.

The memory 29 is preferably formed by a programmable read-only memory (PROM) and the relation between the positions of the first and the second ends to be stored therein can be readily found by successively illuminating each of the first ends 13 and by determining at the same time which second ends 21 emits light in reaction thereto. The coordinates of this first end and this second end are then stored in the memory 29 as belonging to the same light conductor 7.

Figure 6:
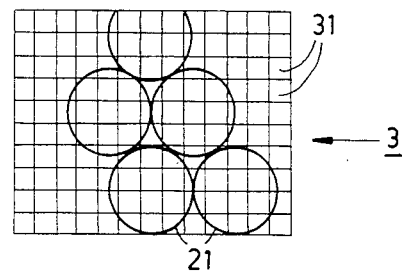
FIG. 6 diagrammatically shows a part of the exit face together with a part of a transducer.

The emission of light by a second end 21 is detected in that one or more photoelectric elements of the transducer 3 produce an electric signal. These photoelectric elements (for example, photosensitive diodes) are generally arranged in a rectangular pattern in the transducer 3. This is diagrammatically shown in FIG. 6 in which a part of the photosensitive surface of the transducer 3 is shown so that the arrangement of the individual photoelectric elements 31 is visible. This Figure also shows some second ends 21 of light conductors 7 to illustrate that the surface area of a second end amounts to a multiple of the surface area of a photoelectric element 31. Consequently, each second end 21 exposes a group of adjacent photoelectric elements 31, so that it can be established with certainty which second end emits light. Even though there are photoelectric elements 31 which can be exposed by two or three second ends 21, with each second end there are always associated some photoelectric elements which cannot be exposed by any other second end. The output signals of the photoelectric elements 31 associated with a second end 21 are preferably added in order to obtain a high output signal. The rectangular pattern of photoelectric elements 31 is usually electronically scanned line-wise as is common practice in transducers for picking-up television pictures. Because each second end 21 cooperates with a plurality of lines, the scanning of, for example, all lines bearing an even sequence number may be omitted without information being lost. The scanning speed of the transducer can thus be substantially increased. Moreover, no information will be lost should a small number of photoelectric elements 31 which are distributed across the transducer 3 become faulty. Consequently, the quality requirements imposed on the transducer 3 may be less severe than those imposed on a transducer for picking up television pictures. Severe requirements need not be imposed either on the quality of any lens arranged between the exit face 11 and the transducer, because imaging faults do not cause a loss of information either.

Figure 7:
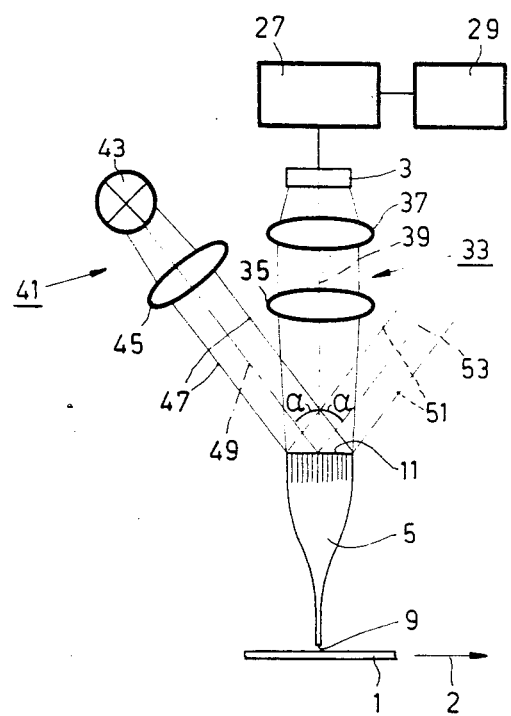
FIG. 7 is a diagrammatic side elevation of a second embodiment of a device in accordance with the invention.

FIG. 7 is a diagrammatic side elevation of a second embodiment of the device in accordance with the invention. Parts which correspond to parts of the first embodiment are denoted by the same reference numerals. This second embodiment differs from the first embodiment first of all in that a lens system 33 is arranged between the exit face 11 of the coupling member 5 and the transducer 3. The lens system 33 comprises two lenses 35, 37 which image the exit face 11 on the photosensitive surface of the transducer 3. The optical axis of the lens system 33 extends perpendicularly to the exit face 11 and is denoted by a stroke/dot line 39. The addition of the lens system 33 offers the advantage that the exit face 11 can thus be imaged on the transducer 3 in an enlarged or reduced form, so that the exit face and the transducer need not have the same dimensions.

A second advantage of the lens system 33 consists in that it enables simple illumination of the document 1 to be scanned via the coupling member 5. To this end, a light source 41 is arranged to the side of the optical axis 39 of the lens system 33; this light source comprises a lamp 43 and a condenser lens 45 and produces an approximately parallel light beam 47 whose axis 49 is also denoted by a stroke/dot line. The axis 49 of the light beam 47 and the axis 39 of the lens system 33 enclose an angle $\alpha$ which is chosen so that at least a part of the light beam is conducted to the document via the coupling member 5, and the part 51 of the light beam which is reflected by the (polished) exit face 11 cannot be incident on the transducer. The reflected part 51 is denoted by broken lines and its axis 53 is denoted by a stroke/dot line. Evidently, this axis also encloses an angle $\alpha$ with respect to the optical axis 39 of the lens system 33. Thanks to the described illumination of the document 1, the light is incident on the document 1 exactly at the area of the entrance face 9 with an intensity which is uniform across the entire width of the entrance face, so that the illumination is optimum, whilst the light 51 reflected by the exit face 11 does not have a disturbing effect on the operation of the transducer 3. Moreover, the device is more compact because the light sources 12 (see FIG. 2) are now superfluous. An even more uniform illumination of the document 1 is obtained when a number of light sources 41 are arranged around the optical axis 39 of the lens system 33 or when the lamp 43 and the condenser lens 45 have an annular construction, their centre being situated on the optical axis 39. In that case the light beam 47 is shaped as a (thick) cone having a half apex angle $\alpha$ (dark field illumination).

What is claimed is:

1. In an apparatus for optical scanning a document, said apparatus having a transducer with photoelectric elements for generating electric output signals in response to transducer light input signals applied thereto, the improvement comprising:

coupling means having an entrance face adapted to be aimed at said document and an exit face optically connected to said transducing means, said coupling means comprising a plurality of light conductors extending from said entrance face to said exit face and having first ends arranged in predetermined positions in said entrance face and second ends situated in random positions in said exit face; and signal processing means connected to said transducer means and comprising memory means for storing the relationship between said predetermined positions of said first ends in a system of coordinates associated with said entrance face and said random positions of said second ends in a system of coordinates associated with said exit face.

2. Apparatus as claimed in claim 1, wherein said first ends are arranged in one line in said entrance face.

3. Apparatus as claimed in claim 2, wherein each of said photoelectric elements has a predetermined photosensitive surface area, and wherein each of said second ends of said light conductors has a surface area equal to a multiple of said predetermined surface area.

4. The apparatus as claimed in claim 3, wherein said second ends of said light conductors are densely packed in said exit face.

5. Apparatus as claimed in claim 1, further comprising a lens system arranged between said exit face and said transducer means.

6. Apparatus as claimed in claim 1, further comprising means for illuminating said document to be scanned.

7. Apparatus as claimed in claim 6, wherein said illuminating means comprises a light source for projecting a light beam onto said exit face and thereby through said coupling member to said document, said light beam having a direction relative to said exit face so that light reflected by said exit face will not impinge on said transducer means.

* * * * *